United States Patent [19]

Allabashi

[11] 3,798,090
[45] Mar. 19, 1974

[54] PROCESS FOR PRODUCING CROSS-LINKED PROPELLANTS

[75] Inventor: John C. Allabashi, Morristown, N.J.

[73] Assignee: Hercules Incorporated, Wilmington, Del.

[22] Filed: Dec. 4, 1968

[21] Appl. No.: 781,284

Related U.S. Application Data

[63] Continuation-in-part of Ser. No. 605,142, Dec. 22, 1966.

[52] U.S. Cl. ............. 149/19.4, 149/18, 149/38, 149/39, 149/44, 149/19.8
[51] Int. Cl. ............................................. C06d 5/06
[58] Field of Search ............ 149/19, 18, 38, 39, 92, 149/44

[56] References Cited
UNITED STATES PATENTS

| | | |
|---|---|---|
| 3,132,976 | 5/1964 | Klager et al. ................ 149/19 |
| 3,141,294 | 7/1964 | Lawrence et al. ............ 149/19 |
| 3,215,573 | 11/1965 | Winkler ..................... 149/19 X |
| 3,245,849 | 4/1966 | Klager et al. ................ 149/19 |
| 3,260,631 | 7/1966 | Witz et al. .................. 149/19 X |
| 3,296,043 | 1/1967 | Fluke et al. ................. 149/19 |
| 3,309,247 | 3/1967 | Bluhm ....................... 149/19 |
| 3,351,506 | 11/1967 | Grigon et al. ............... 149/38 X |

*Primary Examiner*—Benjamin R. Padgett
*Attorney, Agent, or Firm*—Michael B. Keehan

[57] ABSTRACT

Chemically modified double base propellant formulations containing a phenol-blocked diisocyanate as cross-liking agent are cross-linked by unblocking the diisocyanate during propellant cure. A typical formulation contains nitrocellulose, nitroglycerin, ammonium perchlorate or cyclotrimethylene trinitramine, aluminum and a prepolymer of polyglycoladipate and 2,4-tolylene diisocyanate.

10 Claims, No Drawings

PROCESS FOR PRODUCING CROSS-LINKED PROPELLANTS

This application is a continuation-in-part of my copending application Ser. No. 605,142 filed Dec. 22, 1966.

The present invention relates to cross-linkable, nitrocellulose propellant formulations and to a process for producing cross-linked propellants therefrom.

It is known that the mechanical properties of double-base propellants can be improved by using prepolymers of polyglycoladipate and tolylene diisocyanate as cross-linking agents for the nitrocellulose. However, unless all of the ingredients are carefully dried and the moisture content maintained throughout at less than 0.10 percent, propellants with inferior mechanical properties or porosity result. Furthermore, since commercial ingredients usually contain about 0.15 percent water and even in a "dry system" the moisture content is about 0.05 percent, the maintenance of anhydrous conditions creates additional problems and adds appreciably to the cost of the operation.

Now, in accordance with the present invention, it has been found that essentially void-free propellants having the improved properties obtained by the prior process can be produced without the disadvantage of having to employ anhydrous conditions provided that a blocked diisocyanate which unblocks during curing is used as the cross-linking agent.

More particularly, the present invention relates to a propellant formulation consisting essentially of nitrocellulose binder, plasticizer, solid oxidizer, metal fuel, and a plasticizer-soluble diisocyanate blocked with phenolic end groupings, and to a process for producing an essentially void-free propellant therefrom by mixing nitrocellulose binder, solid oxidizer, and metal fuel in the plasticizer containing in solution a diisocyanate blocked with phenolic end groupings at ambient temperature and then curing the mixture under conditions which effect unblocking of the diisocyanate and cross-linking of the nitrocellulose.

By the term "blocked" diisocyanate as used in the present invention is meant a diisocyanate which has been reacted with the active hydrogen of a phenolic compound, i.e., the isocyanato group —NCO is no longer terminal. By "unblocked" is meant that the isocyanato group has been regenerated and become available for reaction.

The blocked nature of the diisocyanate is important to the invention. As stated, it must be blocked with phenolic groupings. Phenols which are suitable as blocking agents are negatively substituted phenols, i.e., phenols substituted with such negative groups as nitro, nitroso, cyano, bromo, chloro, iodo, chloromethyl, dichloromethyl, trichloromethyl, ester, keto, and like groups. Typical of such phenols are o-, m- or p-nitrophenol, o-, m- or p-chlorophenol, o-, m- or p-bromophenol, 2, 4 or 3,4-dinitrophenol, 2,4 or 3,4-dichlorophenol, 2,4 or 3,4-dibromophenol, 4-chloro-2-methylphenol, 4-chloro-3-methylphenol, 3-cyanophenol, 4-cyanophenol, p-hydroxybutyrylphenol, 4-hydroxy-3-methyl-acetylphenol, 4-nitro-3-trifluoromethylphenol, 3-iodophenol, 4-iodophenol, p-nitrosophenol, p-chloromethylphenol, p-dichloromethylphenol, p-trichloromethylphenol, 3-hydroxyethylbenzoate, 4-hydroxyethylbenzoate, and the like. Additionally, the blocked diisocyanate must be soluble in the plasticizer, stable at mixing conditions, and unstable under curing conditions. Preferably, the blocked diisocyanate is relatively stable up to about 40°C. and unstable at about 60°C. so that unblocking will take place at a reasonable rate. Suitable diisocyanates which can be blocked to meet the above criteria include the alkane diisocyanates such as ethylene diisocyanate, trimethylene diisocyanate, hexamethylene diisocyanate and decamethylene diisocyanate; the alkane diiosocyanates such as 1-propylene-1,2-diisocyanate and 1-butylene-1,3-diisocyanate; the alkylidene diisocyanates such as ethylidene diioscyanate and propylidene-1,1-diisocyanate; the aromatic diisocyanates such as m-phenylene diisocyanate, p-phenylene diisocyanate, 2,4-tolylene diisocyanate, 2,6-tolylene diisocyanate, 4,4'-diphenylmethane diisocyanate, naphthalene-1,5-diisocyanate, m-xylylene diisocyanate, 3,3'-dimethoxy-4,4'-biphenylene diisocyanate, and 3,3'-dimethyl-4,4'-biphenylene diisocyanate; prepolymers of polyalkylene ether glycols with aromatic or aliphatic diisocyanates such as the prepolymer of polyethylene ether glycol, polypropylene ether glycol or polytetramethylene ether glycol with 2,4-tolylene diisocyanate; the prepolymers of hydroxy-terminated polyesters with aromatic or aliphatic diisocyanates such as the prepolymers of polyesters obtained from the reaction of polyethylene glycol, polypropylene glycol, polybutylene glycol or polyhexamethylene glycol with succinic acid, adipic acid, sebacic acid, oxadibutyric acid or sulfodipropionic acid with 2,4-tolylene diisocyanate; the prepolymers of hydroxy-terminated polycaprolactones and aromatic or aliphatic diisocyanates; the nitrazapentadiisocyanates such as 4-nitrazapentadiisocyanate; and the like. Such blocked diisocyanates can be readily produced by methods known to the art, as, for example, by reacting the phenol and diisocyanate under nitrogen at above room temperature, and, if desired in the presence of a diluent and/or a catalyst.

The following examples illustrate but do not limit the invention. In these examples all parts and percentages are by weight unless otherwise indicated.

EXAMPLES 1–10

Various propellant compositions were prepared using blocked or nonblocked prepolymer of polyglycoladipate and tolylenediisocyanate (PGA-TDI) in systems containing 0.05 or 0.10 percent water (all ingredients were carefully dried), 0.15 percent water (ingredients used "as received"), or 0.2 percent water (additional water introduced through wet ammonium perchlorate). The nonblocked prepolymer was commercial prepolymer having a molecular weight of 1,250 and containing 5.7 percent isocyanate groups. The blocked prepolymer was prepared by agitating an equivalent weight of m-nitrophenol with an equivalent weight of the commercial prepolymer of polyglycoladipate and tolylenediisocyanate at 80°C. under nitrogen for 4 hours, transferring the reaction mixture to storage containers and maintaining at 80°C. without agitation for 6 days at which time any residual isocyanate was removed by adding a stoichiometric amount of ethylene glycol and stirring for 20 hours at 80°C. The propellant compositions were prepared as follows: The prepolymer of polyglycoladipate and diisocyanate (PGA-TDI) or the blocked prepolymer thereof (B-PGA-TDI) was dissolved in dry nitroglycerin plasticizer (NG) containing 0.67 percent stabilizer 2-nitrodiphenylamine (NDPA) and 0.45 percent of dibutyl tin diacetate catalyst, and the resultant solution evacuated for 20 minutes to remove air. The solution was then transferred to a mixer into which plastisol nitrocellulose (NC) of 12.6 percent nitrogen and 2.3 percent of a stabilizer comprising 1 percent resorcinol, 1% $MnO_2$, and 0.3 percent 2-nitrodiphenylamine, based on the weight of propellant, were added and mixed for about 3 minutes after which time the ammonium perchlorate (AP) or cyclotrimethylene trinitramine (HMX) oxidizer was added and mixing continued for 10 minutes. Into this mixture was then mixed for 5 minutes the aluminum metal (Al) to give a slurry and the resultant slurry was mixed for an additional 15 minutes under vacuum. The slurry was then cast into an appropriate mold, deaerated for 1.5 hours at 1 mm. Hg and cured for 6 days at 38°C. and 4 days at 60°C. (Exs. 2, 4, and 7) for 4 (Exs. 1, 3, 5, and 6) 5 (Ex. 10) or 7 (Ex. 9) days at 60°C. or for 4 days at 42°C. and 18 days at 60°C. (Ex. 8). The composition of the propellants of these examples and data on the properties of the propellants are tabulated below.

be tolerated without porosity. The significance of applicant's findings can be better appreciated by a comparison of the amount of water and isocyanate present in the system on an equivalency basis. At the 0.2 percent water level there is a two-fold mole equivalent excess of water present per equivalent of isocyanate whereas in the "dry" system there is a two-fold excess of isocyanate to water. Thus the margin of safety with respect to porosity of grain can be considerably increased through the use of the blocked diisocyanates of the invention.

The amount of blocked diisocyanate necessary to effect cross-linking of the propellant formulation will depend upon the particular formulation and the cross-linking agent employed. Generally speaking, amounts of 6 to 9 percent will be sufficient to yield good mechanical properties while maintaining the impulse level of the propellant at a maximum. Cross-linking, as stated, is effected by curing the propellant formulation under conditions which unblock the diisocyanate. Preferably, curing is carried out at elevated temperature, as, for example, 38° to 60°C. for 4 to 18 or more days.

| | PROPELLANT COMPOSITION (Parts by Weight) | | | | | | | | | | PROPERTIES | | |
|---|---|---|---|---|---|---|---|---|---|---|---|---|---|
| | | | | | Oxidizer | | | | | | Tensile Strength | Elongation | Modulus × 10−2 |
| Ex. No. | NC | NG | PGA-TDI | B-PGA-TDI | AP | HMX | Al | Catalyst | $H_2O(\%)$ | Porosity | (p.s.i.) | (%) | (p.s.i.) |
| 1 | 14.0 | 27.2 | 6.5 | — | 45.0 | — | 9.0 | — | 0.1 | No | 165 | 95 | 922 |
| 2 | 14.0 | 25.0 | — | 8.5 | 45.0 | — | 9.0 | 0.2 | 0.1 | No | 213 | 76 | 938 |
| 3 | 14.0 | 27.2 | 6.5 | — | 45.0 | — | 9.0 | — | 0.2 | Yes | Not obtained | Porous | Porous |
| 4 | 14.0 | 25.0 | — | 8.5 | 45.0 | — | 9.0 | 0.2 | 0.2 | No | 168 | 67 | 1050 |
| 5 | 6.0 | 27.2 | 6.5 | — | 45.0 | — | 13.0 | — | 0.05 | No | 53 | 55 | 314 |
| 6 | 6.0 | 27.2 | 6.5 | — | 45.0 | — | 13.0 | — | 0.15 | Yes | Not obtained | Porous | Porous |
| 7 | 6.0 | 25.0 | — | 8.5 | 45.0 | — | 13.0 | 0.2 | 0.15 | No | 55 | 59 | 360 |
| 8 | 6.0 | 23.2 | 5.5 | — | — | 47.0 | 18.0 | — | 0.05 | No | 146 | 94 | 833 |
| 9 | 3.3 | 26.9 | 6.8 | — | — | 46.5 | 16.2 | — | 0.15 | Yes | Not obtained | porous | Porous |
| 10 | 6.0 | 23.3 | — | 7.8 | — | 45.4 | 17.0 | 0.2 | 0.15 | No | 70 | 39 | 717 |

The above data show that the mechanical properties of propellants prepared with blocked prepolymers are better than those with nonblocked prepolymer when equal amounts of water are present in the system (comparison of Examples 1 and 2), that essentially the same properties can be obtained with "wet" ingredients using blocked prepolymer as with "dry" materials using nonblocked prepolymer (Examples 1 v. 4 and 5 v. 7) and that more water can be tolerated in the system if a blocked prepolymer is used (Examples 3 v. 4; 6 v. 7; and 9 v. 10).

In addition to the procedural and economic advantages of being able to use commercially available ingredients without predrying, the use of the blocked diisocyanates of the invention offers the safety feature of desensitizing the plasticizer.

As the examples show, by the process of the present invention it is possible to produce void-free cross-linked propellants in the presence of small amounts of water. The maximum amount of water which can be tolerated in the system without introducing porosity depends primarily upon the amount of nitrocellulose employed. For example, at low nitrocellulose levels (6 percent or below), void-free cross-linked propellants can be produced with as much as 0.15 percent water in the overall system whereas at higher nitrocellulose levels (14 percent), as much as 0.2 percent or more can When necessary, acid catalysts may also be employed to facilitate unblocking. Suitable acid catalysts which do not affect propellant stability include the organo tin compounds such as dibutyltindiacetate, dibutyltindilaurate, and the like.

Ingredients other than those named above and which do not interfere with the cross-linking action or do not adversely affect stability of the propellant can also be present in the formulation. For example, the solid oxidizer can be an inorganic or organic oxidizing agent. Thus instead of ammonium perchlorate, other inorganic oxidizing salts such as the ammonium, alkali metal or alkaline earth metal nitrates can be used alone or in mixtures with other inorganic oxidizing salts such as the chromates, dichromates, permanganates, chlorates and perchlorates of the alkali or alkaline earth metals or ammonia. Likewise, instead of cyclotrimethylene trinitramine other organic oxidizers such as cyclotetramethylene tetranitramine, pentaerythritol tetranitrate, dipentaerythritol hexanitrate, ethylene dinitramine, 2,4,2', 4'-tetranitro-oxanilide, 2,4,6,2', 4', 6'-hexanitro-oxanilide, mannitol hexanitrate, nitroguanidine, lead 2,4-dinitroresorcinate, lead 4,6-dinitroresorcinol, trinitrotoluene, and the like can be used alone or in mixtures with each other or with one or more of the above inorganic oxidizing salts. Instead of nitroglycerin the plasticizer can also be other nitrate esters such as trimethylolethane trinitrate, diethyleneglycol dinitrate, triethyleneglycol dinitrate, 1,2,4-butanetriol trinitrate, bis(dinitropropyl) acetal, bis(dinitropropyl) formal, glycerol monolacetate trinitrate, glycol dinitrate, nitroisobutylglycerol trinitrate, and the like, and other plasticizers such as triacetin, the phosphates such as tributylphosphate, the phthalates, difluoroamino compounds, and the like can also be present to improve the compatability or solubility of the blocked diisocyanate. In addition to aluminum, other metal fuels such as aluminum hydride, beryllium, beryllium hydride, zirconium and the like can be used, and the propellant can contain other well known agents such as processing aids, wetting agents, and the like.

The formulations of the present invention are suitable for solution, or slurry or casting powder processes, and many modifications and variations of the invention will be obvious to those skilled in the art in light of the above teachings.

What I claim and desire to protect by Letters Patent is:

1. A process for producing a solid propellant comprising mixing at ambient temperature nitrocellulose binder, solid oxidizer, and metal fuel with a plasticizer containing in solution a blocked diisocyanate prepared by reacting a diisocyanate with a negatively substituted phenol and then curing the mixture at 38° to 60°C. whereby unblocking of the diisocyanate and cross-linking of the nitrocellulose occurs.

2. The process of claim 1 wherein the plasticizer is a nitrate ester.

3. The process of claim 2 wherein the curing is effected in the presence of an unblocking catalyst.

4. The process of claim 3 wherein the nitrate ester is nitroglycerin and the diisocyanate is a prepolymer of polyglycoladipate and 2,4-tolylenediisocyanate having the isocyanate end groups blocked with m-nitrophenol.

5. A propellant formulation consisting essentially of nitrocellulose binder, plasticizer, solid oxidizer, metal fuel, and a plasticizer-soluble, blocked diisocyanate prepared by reacting a diisocyanate with a negatively substitued phenol.

6. The formulation of claim 5 wherein the plasticizer is a nitrate ester.

7. The formulation of claim 6 wherein the nitrate ester is nitroglycerin and the blocked diisocyanate is the reaction product of a prepolymer of polyglycoladipate and 2,4-tolylenediisocyanate with m-nitrophenol.

8. The formulation of claim 7 wherein the oxidizer is cyclotrimethylene trinitramine and the metal fuel is aluminum.

9. The formulation of claim 7 wherein the oxidizer is ammonium perchlorate and the metal fuel is aluminum.

10. The formulation of claim 9 also containing dibutyltindiacetate catalyst.

* * * * *